(12) United States Patent
Dobbins

(10) Patent No.: US 9,688,399 B1
(45) Date of Patent: Jun. 27, 2017

(54) REMOTELY OPERATED SURVEILLANCE VEHICLE MANAGEMENT SYSTEM AND METHOD WITH A FAIL-SAFE FUNCTION

(71) Applicant: David R. Dobbins, North Augusta, SC (US)

(72) Inventor: David R. Dobbins, North Augusta, SC (US)

(73) Assignee: Civicus Media LLC, Augusta, GA (US)

( * ) Notice: Subject to any disclaimer, the term of this patent is extended or adjusted under 35 U.S.C. 154(b) by 301 days.

(21) Appl. No.: 14/490,767

(22) Filed: Sep. 19, 2014

Related U.S. Application Data

(60) Provisional application No. 61/879,843, filed on Sep. 19, 2013.

(51) Int. Cl.
*B64C 19/00* (2006.01)
*B64C 39/02* (2006.01)
*G05D 1/00* (2006.01)

(52) U.S. Cl.
CPC ......... *B64C 39/024* (2013.01); *G05D 1/0022* (2013.01); *G05D 1/0038* (2013.01); *G05D 1/0055* (2013.01); *G05D 1/0094* (2013.01)

(58) Field of Classification Search
CPC .. B64C 39/024; G05D 1/0022; G05D 1/0038; G05D 1/0055; G05D 1/0094
See application file for complete search history.

(56) References Cited

U.S. PATENT DOCUMENTS 8,644,512 B2 * 2/2014 Khazan ............... G05D 1/0022
380/258

9,152,147 B2 * 10/2015 Khazan ............... G05D 1/0022
(Continued)

OTHER PUBLICATIONS

Tso, Kam S., Gregory K. Tharp, Wayne Zhang, and Ann T. Tai. "A multi-agent operator interface for unmanned aerial vehicles." In Digital Avionics Systems Conference, 1999. Proceedings. 18th, vol. 2, pp. 6-A. IEEE, 1999.*

*Primary Examiner* — Thomas G Black
*Assistant Examiner* — Peter D Nolan
(74) *Attorney, Agent, or Firm* — Overhauser Law Offices LLC

(57) ABSTRACT

A system for providing the general public with simplified access to aerial surveillance. The system software initially functions as a viewer, but also provides a path to increase a participant's control. The software architecture is structured to accommodate multiple users simultaneously and minimizes operational down-time by organizing participants into a standby queuing system. The system also provides a step-by-step operator-pilot progression, with built in training and certification modules, to train and qualify a participant for higher levels of control. This progression starts by allowing a participant to remotely track the flight path of a surveillance aircraft, then view its camera feed, operate the camera, and eventually pilot the aircraft. The system in applicable whether the aircraft is manned or unmanned, and incorporates an interrupt mechanism to mitigate undesirable mission parameters. In some configurations, the invention's integral fail-safe mechanism optimizes operational compatibility with restrictive civil airspace providing even broader access. The software supports an organizational structure for promotions, accounting and user-queuing. This structure is driven by financial incentives which leverage social media, banner advertising, and streaming video for live public viewing, while incorporating natural safeguards against misuse.

25 Claims, 10 Drawing Sheets

(56) References Cited

U.S. PATENT DOCUMENTS

| | | | | |
|---|---|---|---|---|
| 9,162,753 | B1* | 10/2015 | Panto | B64C 19/00 |
| 2004/0107028 | A1* | 6/2004 | Catalano | B64D 45/0015 |
| | | | | 701/2 |
| 2007/0243505 | A1* | 10/2007 | Rath | G09B 9/48 |
| | | | | 434/29 |
| 2007/0244608 | A1* | 10/2007 | Rath | G05D 1/0038 |
| | | | | 701/3 |
| 2012/0237028 | A1* | 9/2012 | Khazan | G05D 1/0022 |
| | | | | 380/201 |
| 2014/0018976 | A1* | 1/2014 | Goossen | G06F 17/00 |
| | | | | 701/2 |
| 2014/0018979 | A1* | 1/2014 | Goossen | G08G 5/0034 |
| | | | | 701/3 |
| 2014/0222250 | A1* | 8/2014 | Khazan | G05D 1/0022 |
| | | | | 701/2 |
| 2014/0324253 | A1* | 10/2014 | Duggan | G05D 1/0061 |
| | | | | 701/3 |

\* cited by examiner

Options: Participation and Certification Levels

| Permitted to: | View Published Flight Paths | View Published Imaging | Post, Link and Publish | Operate Camera | Direct Aircraft | Set Privacy Levels | Flight Zone Limitations | Failsafe System | Member/User Management |
|---|---|---|---|---|---|---|---|---|---|
| Visitor | yes | limited pre-recorded | social media posts | no | no | no | no | Access to misuse reporting system | Access to public policy |
| Client (registered user) | yes | Live | social media posts | Access to camera certification simulator | Access to pilot certification simulator | no | no | Access to misuse reporting system | Access to public policy |
| Pro Client | yes | Access to live imagry and archives | social media posts and link; publishing reseller | no | no | no | no | Policy guided reporting of misuse | Agrees to policy |
| Operator | yes | Live | social media post, link | yes | if certified | ID cloaking | no | Policy guided reporting of misuse | Agrees to policy |
| Pilot | yes | Live | social media post, link | if certified | yes | ID cloaking | no | Policy guided reporting of misuse | Agrees to policy |
| Pro Pilot/ Operator | yes | Live | social media post, link | yes | yes | ID cloaking | no | Policy guided reporting of misuse | Agrees to policy |
| Commercial Pilot/ Operator | yes | Live | social media post, link | yes | yes | ID cloaking | no | Policy guided reporting of misuse | Agrees to policy, meets experience req., promoted to Sponsors and Pro Clients |
| Sponsor (per contract) | yes | Access to live imagry and archives | social media posts, linking, and live hosting, advertising banner | if certified | if certified | Can set image/ flight access Live/Delayed/ Select/Blackout | Can set geofencing limits for flight | Mission monitoring responsibility and report of misuse | Can adjust fee schedule within sponsor agreement |
| Provider/ Licensee (per contract) | yes | Access to live imagry and archives | promotional posting rights | if certified | if certified | Can set image/ flight access Live/Delayed/ Select/Blackout | Can set geofencing limits for flight | Can override all system functions, including mission termination | Manage fee structure & mission policy |
| Licensor | yes | Access to live imagry and archives | promotional posting rights | yes | yes | Can set image/ flight access Live/Delayed/ Select/Blackout | Can set geofencing limits for flight | Can override all system functions, including mission termination | Set fee structure & mission policy |

Fig. 6

| Options: Participant Fees and Compensation | | | | | | | | | |
|---|---|---|---|---|---|---|---|---|---|
| $ Revenue (+) or (-) per Participant | View Published Flight Paths | View Published Imaging | Post, Link and Publish | Operate Camera | Direct Aircraft | Set Privacy Levels | Flight Zone Limitations | Failsafe System | Member/User Management |
| Visitor | No fee | No fee | No fee | n/a | n/a | n/a | n/a | None | n/a |
| Client (registered user) | No fee | No fee | No fee | (-) SimApp download fee | (-) SimApp download fee | n/a | n/a | (+) Possible credits awarded for validated report | n/a |
| Pro Client | No fee | (-) Live Image and Archive account | (+/-) Reseller: incl. percentage fee and income stream | n/a | n/a | n/a | n/a | (+) Possible credits awarded for validated report | n/a |
| Operator | No fee | No fee | No fee | (+/-) FlexFee cost/award program | (+/-) FlexFee cost/award program | (-) Increased rate for cloaking | n/a | (+) Possible credits awarded for validated report | n/a |
| Pilot | No fee | No fee | No fee | (+/-) FlexFee cost/award program | (+/-) FlexFee cost/award program | (-) Increased rate for cloaking | n/a | (+) Possible credits awarded for validated report | n/a |
| Pre Pilot/ Operator | No fee | No fee | No fee | (+/-) FlexFee cost/award program | (+/-) FlexFee cost/award program | (-) Increased rate for cloaking | n/a | (+) Possible credits awarded for validated report | n/a |
| Commercial Pilot/ Operator | No fee | No fee | No fee | (+/-) FlexFee cost/award program | (+/-) FlexFee cost/award program | (-) Increased rate for cloaking | n/a | (+) Possible credits awarded for validated report | n/a |
| Sponsor (per contract) | No fee | (-) Fee per agreement | (-) Fee per agreement | (+/-) FlexFee cost/award program | (+/-) FlexFee cost/award program | (-) Subject to sliding scale for level of restrictions | (-) Subject to sliding scale for level of restrictions | (+) Possible credits awarded for validated report | (-) Certification and currency fee |
| Provider/ Licensee (per contract) | No fee | No fee | No fee | (+) Sponsor, User fee shares | (+) Sponsor, User fee shares | (-) Subject to sliding scale for level of restrictions | (-) Subject to sliding scale for level of restrictions | No fee | (+/-) FlexFee builds own fee structure within agreement |
| | | | | | | | | | (-) Franchise fee structure, system lease |
| Licensor | n/a | n/a | n/a | (+) Sponsor, User fee shares | (+) Sponsor, User fee shares | n/a | n/a | n/a | (+) Franchise fee structure, system lease |

Fig. 7

REMOTELY OPERATED SURVEILLANCE VEHICLE MANAGEMENT SYSTEM AND METHOD WITH A FAIL-SAFE FUNCTION

RELATED APPLICATION DATA

This application claims the benefit of U.S. Provisional App. 61/879,843 filed Sep. 19, 2013, the disclosure of which is incorporated by reference.

BACKGROUND

The present invention relates to methods of organizing systems and processes associated with aerial surveillance services; more particularly, but not exclusively to software applications for operating multi-user aerial surveillance platforms while organizing users and surveillance data. The invention further relates to fail-safe mechanisms for preserving air-traffic safety and respecting privacy.

Since the Sep. 11, 2001 terrorist attacks on the United States, and the subsequent Global War on Terrorism, much emphasis has been placed on the practical use and effectiveness of Unmanned Aerial Systems (UAS), or Unmanned Aerial Vehicles (UAV's), commonly referred to as Drones. A recent study shows that over the next ten years a projected $89 billion will be spent in this market. A dominating initiative in the industry is the commercial application of this technology in US National Airspace. Another major initiative is to accommodate these operations under approval by the Federal Aviation Administration (FAA).

In recent years it has been common to obtain approval for very restrictive zones of airspace through a Certificate of Authorization (COA's). And more recently approvals have been received for operating small UAV's, under 55 pounds, in remote areas like that along the Alaskan coastline. Since 1981 guidelines have also been provided for model aircraft operators. These guidelines restrict their flights to below 400 feet AGL (above-ground-level), and restrict these areas of operation to avoid persons, property and full-scale aircraft. This provision has historically been depended upon by operators to perform commercial imaging services using camera equipped remote-controlled aircraft (RC's). At present, the FAA has restricted this activity to non-commercial operations. So, by all indications, these types of services are highly desirable but must be done within FAA limitations. Another designation of airspace that is used, primarily by the government, for UAV flights is that airspace between 18,000 feet MSL (mean-sea-level) and Flight Level 600, approximately 60,000 feet. This is Class A airspace and is often referred to as positive control airspace. It has formidable operational requirements that make it impractical for most commercial surveillance applications. So, for a number of factors, the US National Airspace above the RC operators, and even better, above uncontrolled airspace which typically extends to 700 or 1200 feet AGL, and below 18,000 feet (or Class E Airspace), is the most preferred airspace for commercial UAV operations. Class E Airspace is also the most commonly used airspace by general aviation, hence the conflict.

Some general aviation aircraft perform within the desired standards of the most effective UAV's. It has been determined that a surveillance aircraft which can slow to near-traffic-speeds, can orbit over small target areas, and can transit to new areas considerably faster than highway travel, is most practical for commercial operations. In fact, some of these small manned aircraft have been converted to fully-unmanned autonomous aircraft. Another relevant factor is that while testing and developing autonomous-vehicle-technology some developers have provided an operator or pilot onboard with over-ride capabilities for the safety of the operation. Also relevant, is the fact that commercial aerial imaging services have been safely performed for years within Class E Airspace, and with general aviation aircraft. From a cost perspective, there is already a large pool of qualified pilots to perform commercial pilot-in-command services in these aircraft; in particular those who need to meet 1,500 hours-of-experience requirements for Part 121 Air Carrier operations. At present, these pilots typically work at a lower pay rate than commercial UAV pilots. It has also been estimated that insuring manned commercial surveillance operations will remain significantly less expensive than insuring an unmanned operation. And, general aviation aircraft are already certified and approved for commercial operations in Class E Airspace.

What is missing in this equation is the capacity for managing multiple customers who can view images in real-time from a remote location, and have the option to safely direct the camera and flight path, much like a UAV, without each customer needing to obtain their own unmanned system, FAA certifications, and FAA authorizations.

It becomes known by the features of this invention that it is practical, and most cost effective, to provide commercial UAV-type services (which may be referred to as drone emulation) by using manned general aviation aircraft in Class E Airspace, modified to be selectively remotely directed. The method by this invention need not distinguish or make it apparent whether the aircraft is manned or unmanned. It is anticipated by this invention that future unmanned operations, when proper safeguards have been developed, will benefit by operating with the same method and management process.

SUMMARY OF THE INVENTION

Therefore, an object of the present invention is to provide a means, through a software application, for organizing and managing aerial surveillance operations. The application allows internet users access to a website to view and follow the flight path of aerial surveillance missions. The Visitor is subsequently offered an opportunity to register with the Provider and download software to view live data from a surveillance camera carried by the aircraft. The software continues by prompting the Visitor to explore higher levels of participation. As a registered Client the user can be offered Pro Client status which allows him/her to view and record live imagery, research the image archives, and resell his/her collected data.

Another option for a Client is to progress through an online simulator-based Camera Operator Course and be certified as an Operator. With this certification the user, now termed an Operator, is permitted to join a queue of other Operators to await opportunity to direct the surveillance camera. An additional Client option is to progress through another online simulator-based Pilot Course and be certified as a surveillance Pilot. With this certification the user, now termed a Pilot, is permitted to join a queue of other Pilots to await opportunity to direct the surveillance aircraft's flight path. Thus, it is to be understood that, as used herein, the term Operator refers to one who controls a camera on the aircraft, whereas the term Pilot refers to one who controls the flight path of the aircraft.

A user may be dual qualified and be recognized as a Pro Pilot/Operator giving the user access for both directing the camera and directing the aircraft's flight path. A Pro Pilot/Operator is eligible, after meeting certain experience requirements, to progress though another online course to certify as a Commercial Pilot/Operator. Commercial status affords the user recognition as a Pilot/Operator for hire, and may be sanctioned to provide fee-based services.

The present invention, as an application software series, can be licensed to a service Provider/Licensees who may use the software to manage the operation of an aerial surveillance system which includes an aircraft, a camera pod, and a Mission Manager. The Provider may choose to make the system available to Sponsors, Operators, Pilots, Visitors and Clients or may elect to operate it discretely. A Sponsor may contract for all or part of a flight mission and use it for advertising and promotion, while earning revenue from Pilots, Operators and Pro Clients.

Inherent to the nature of aerial surveillance is a potential for incursions involving airspace, other aircraft, weather, or terrain. It is also possible to exceed aircraft and system limitations. There are additional concerns of breaching privacy and security. This present invention anticipates these concerns by building in several safeguards. The first safeguard is the integration of a Mission Manager who provides a fail-safe mechanism. This mechanism allows any mission to meet certain operation and regulatory requirements. These requirements may include instrument-flight-rules (IFR), and or visual-flight-rules (VFR) and can fulfill the VFR requirement for see-and-be-seen capabilities. Typically, the Mission Manager will be an FAA certificated pilot, meaning a pilot who is certified by the FAA (federal aviation administration) to operate the aircraft in FAA controlled airspace. Therefore, the Mission Manager acts as the overall pilot-in-command for the aircraft, and in one configuration, must approve each flight-directing input. In another configuration, the Mission Manager has the option to take full command of all flight functions, or to allow-and-observe the Pilot (or Operator/Pilot) as he directs the aircraft.

The concerns for breaching privacy and security are addressed in two ways. The Mission Manager and Provider each have the ability to censor image output by disrupting the imaging process. An additional feature of the software allows every user access to a system for reporting misuse. These reports alert the Mission Manager and/or Provider/Licensee who may terminate the image feed as needed.

Another primary function of the present invention is to organize and employ a variable fee structure which automatically channels revenue to qualified participants. There are many user options at multiple levels which affect the marketing value of related services. Therefore, this software functions to manage scalable fee and reward trade-offs, thereby offering an incentive to participate, while optimizing revenue to the Provider.

In another aspect, what is provided is a novel system for providing the general public with simplified access to aerial surveillance. The system software initially functions as a viewer, but also provides a path to increase a participant's control. The software architecture is structured to accommodate multiple users simultaneously and minimizes operational down-time by organizing participants into a standby queuing system. The system provides a step-by-step operator-pilot progression, with built in training and certification modules, to train and qualify a participant for higher levels of control. This progression starts by allowing a participant to remotely track the flight path of a surveillance aircraft, then view its camera feed, operate the camera, and eventually pilot the aircraft. The system may be utilized whether the aircraft is manned or unmanned, and incorporates an interrupt mechanism to mitigate undesirable mission parameters. In some configurations, the system's integral fail-safe mechanism optimizes operational compatibility with restrictive civil airspace providing even broader access. The software supports an organizational structure for promotions, accounting and user-queuing. This structure is driven by financial incentives which leverage social media, banner advertising, and streaming video for live public viewing, while incorporating natural safeguards against misuse.

BRIEF DESCRIPTION OF THE DRAWINGS

FIG. 6 is a matrix table of the preferred embodiment for user participation, as limited by subscription and certification level.

FIG. 7 is a matrix table of the preferred embodiment for participant options relating to a fee and compensation model.

DETAILED DESCRIPTION

This information is disclosed to fully detail the principles and applications of the present invention: a computer-implemented method and management system with a fail-safe function, designed for aerial surveillance operations. The following descriptions will reference the illustrations of FIG. 1 through FIG. 10 with specific language that is not intended to limit the scope of the invention. Any configuration or modification of the described embodiment, and any application of the described principles, as might occur to one skilled in the art, are therefore considered the intent of this preferred embodiment.

Currently, systems are in practice which collect and broadcast aerial images in real-time or are saved in a recorded format. Some system configurations also support the multi-casting of collected data for multi-viewer distribution, which may or may not utilize the internet as a broadcast means. Some surveillance aircraft have been equipped with a plurality of cameras whereby operators may point the cameras from a remote station or from a station on-board the aircraft. There are known systems which include a method of command and control through various means to guide the direction of a surveillance aircraft and to point a camera. These control means may include prompting through an internet link to operate part of the system. Other systems provide a means to hand-over the flight control of an aircraft, or the camera, to a remote operator. Further, internet-based programs are currently known for the training and certification of operators for a system. Variations of these existing principles are anticipated and are intrinsic to the preferred embodiment hereby disclosed to incorporate any and/or all of these variation as a subset within the operation of a computer-implemented method and management system with a fail-safe function.

Figure 1:
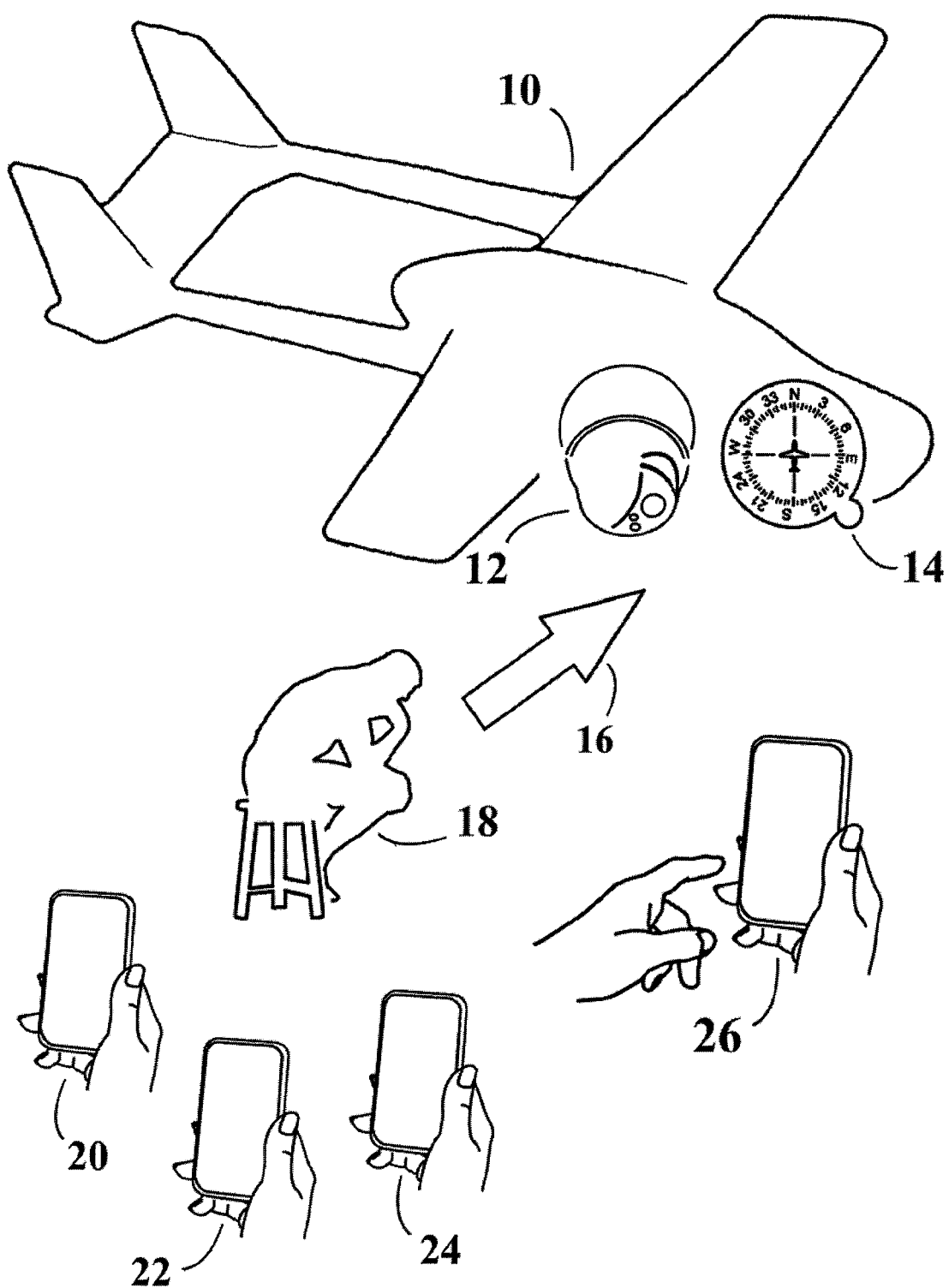
FIG. 1 is a schematic diagram illustrating the major components comprising an aerial surveillance system viewed and controlled from a mobile application, while incorporating an imbedded failsafe system with override protection.

A generalized overview is provided in FIG. 1. Referring to FIG. 1, surveillance Aircraft 10, which can be any remotely operable sensor platform with a sensor payload, is operated by a person/user utilizing a communication device as in Operator-Pilot 26. While functioning as a Pilot 26, the user can direct the aircraft guidance system 14. Additionally, as a payload Operator 26, the user can direct the Camera Pod 12, which can be any surveillance sensor device carried by the aircraft. Aircraft and camera directing by Operator-Pilot 26, may be separate or simultaneous. While either or both functions are being performed, an imbedded Mission Manager 18, who may be separate from the aircraft or a certified pilot on-board, can monitor operations and provide fail-safe management 16 without being apparent to the remote Operator-Pilot 26. Separate and apart from these functions, the sensor output can be viewed by multiple Viewers 20, 22, and 24.

Generally, to enable a commercially viable aerial surveillance system in controlled civil-airspace it is desirable to widely distribute imaging data; to provide third-party Operator-Pilots 26 a simple method of controlling a Camera Pod 12 and an Aircraft 10; and to regulate these controls by building a certified pilot or Mission Manager 18 into the system as part of a fail-safe mechanism.

Figure 2:
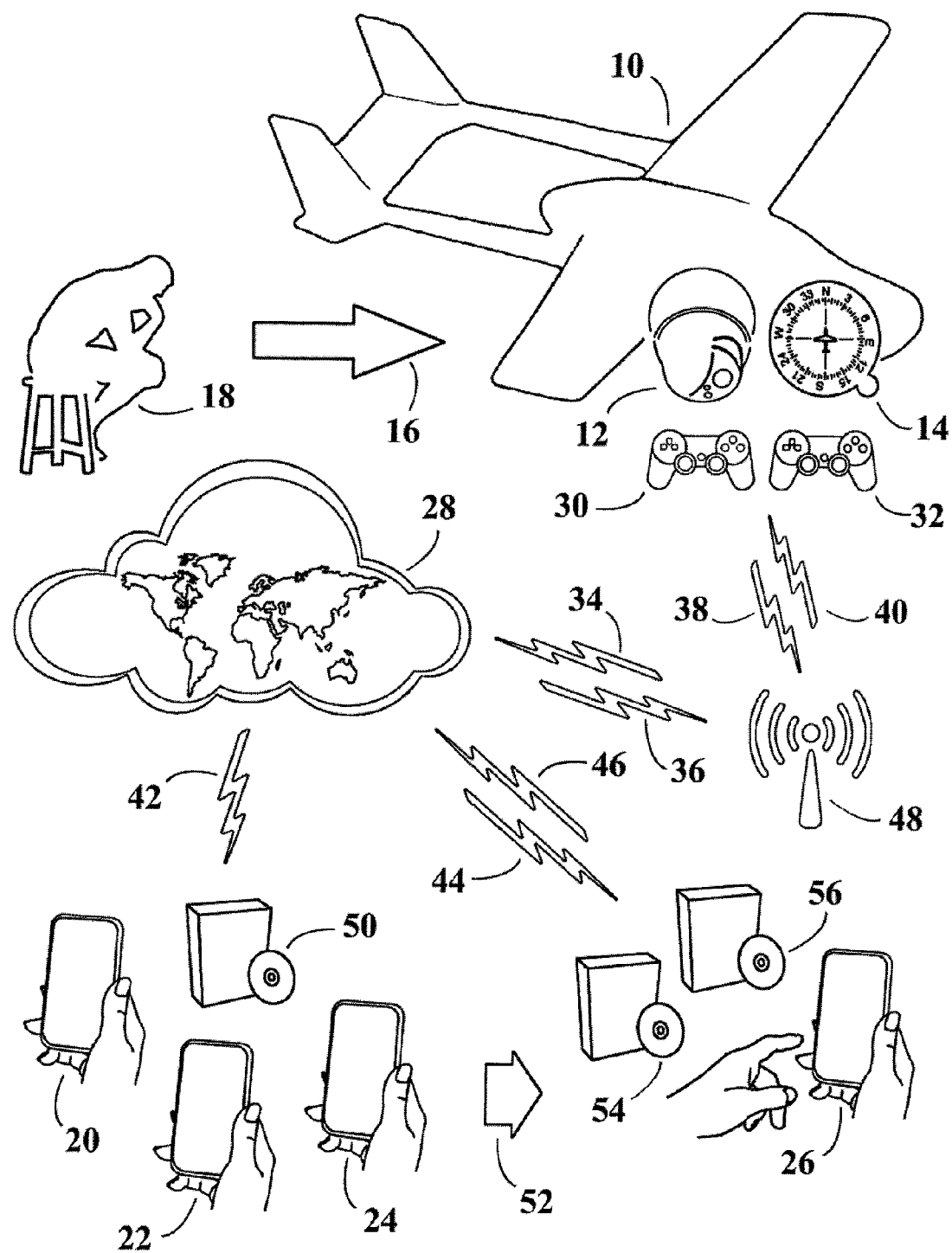
FIG. 2 is a schematic diagram illustrating the relationship between the components comprising an aerial surveillance system with data links, viewing participants, an active operator-pilot, systems hardware, application software, and a failsafe system.

All of the features of FIG. 1 are contained in the more detailed view of FIG. 2. Therefore, referring to FIG. 2, the preferred embodiment of the method and system, represented by components 10 through 56, according to the present invention includes a manipulatable platform or aircraft 10. The aircraft 10 carries a sensor system comprised of a sensor or camera pod 12 that is controlled by way of a camera control system 30. The aircraft 10 is dependent upon an aircraft guidance system 14, which is subject to the flight control system 32.

The Operator-Pilot 26 is a communication-device-enabled manipulator of the system. The Operator-Pilot 26 utilizes a computing device implementing camera control software 54 and flight control software 56. The camera control software provides for remote operation of the cameras in the camera pod 12 and the flight control software 56 provides for remote control of the flight path of the aircraft 10.

One or more potential recipients of system data (i.e. feeds from the cameras of the camera pod 12) are represented as the Viewers 20, 22, and 24. The Viewer's utilize computing devices implementing viewer software 50, which allows the viewers to view the flight path of the aircraft and feeds from the camera pod. A structure to qualify candidates (i.e. the Viewers 20, 22, 24) for the role of operator-pilot 26 is represented as upgrade training 52.

Communications between the various components take place over the internet 28. A signal download means, represented by signal 42, provides internet relayed data from systems aboard the aircraft 10 to viewer 20, 22, and/or 24, by interface with the viewer software 50. A signal upload means to internet 28, represented by signal 46, connects upload data from camera control software 54, and/or flight control software 56. A signal download means, represented by signal 44, provides relayed data to the operator-pilot 26, by interface with the control software programs 54, and/or 56. A signal upload connection to systems onboard aircraft 10, from internet 28, through signal repeater 48, is provided by means of signal 36, then signal 40, to manipulate the controllers 30, and/or 32, the camera control system and flight control systems respectively. A signal download connection is also provided from systems onboard aircraft 10, to internet 28, through signal repeater 48, by means of signal 38, then signal 34, to be distributed through internet 28, as prompted by software applications 50, 54, and/or 56. A safeguarding system comprised of a mission manager 18, and a mechanism for fail-safe management 16 is also provided to suspend and/or override the command input of operator-pilot 26.

It is to be understood that the internet 28 is one means of widely distributing the operating signals (i.e. the uploading of command prompts and the dissemination of collected data) but is not a requirement of this invention. It is anticipated that any of the invention software applications 50, 54, or 56 may enable a local computer server with a different connection means to signal repeater 48, to communicate with systems onboard aircraft 10, without the use of internet 28. It is further anticipated that signal repeater 48, may involve any variety or combination of signal transferring technologies whether present or future.

The aircraft 10 is typically a motorized, propeller driven, or fixed wing aircraft, and serves in the present invention as a means of hosting and positioning a sensor payload as in camera pod 12. This means of hosting a sensor payload includes varying forms of host mechanisms which can be a submersible craft for marine navigation, a ground based mechanical-lift, a ground based motor vehicle, a lighter-than-air craft (tethered or free-flying), or any form of flying apparatus to include rotor-wing, glider, turbine-craft, rocket or satellite, in that the host mechanism has systems to monitor or manipulate in order to achieve or maintain its position in space.

The camera pod 12, or sensor, is typically a gimbal mounted camera and can be operated by the user through a variety of functions such as pan-tilt-zoom, and focus; and is either an electro-optical digital imager for use in visible light, or a camera which is sensitive to infrared wave-length for use in low-visibility. Variations of camera pod 12, may include a plurality of imagers or sensors; a plurality of devices acting coaxially or that are divergent; or whereby any other form of data gathering technology is incorporated.

The operator-pilot 26, and viewers 20, 22, and 24 are represented using mobile smart-phones. Any computer, tablet or electronic device, or combination of devices which can communicate a signal, and can view data collected by a sensor is alternately anticipated for this element.

The software applications 50, 54, and 56 are typically loaded onto a stand-alone computer device and run on the operating system of said device. It is also anticipated that any of these programs can be operated as a cloud-based application or on any other computer operating system which can transfer or store data.

Relating to the mission manager 18, one configuration employs the manager as a pilot who is physically onboard the aircraft 10 and may be recognized by regulating authorities (i.e. the FAA) as the pilot-in-command. In another configuration the manager 18 is employed in a separate control station and may or may not be recognized by regulating authorities as the pilot-in-command. In either configuration, and whether the mission manager 18, is manually manipulating the controls while following prompts sent by the operator-pilot 26 or is monitoring inputs by the operator-pilot 26, and accepting or allowing these inputs to feed into the aircraft's flight control system 32 (in the form of a flight directing auto-pilot) or is monitoring inputs by the operator-pilot 26 which automatically feed into the flight control system 32 in the form of a flight directing auto-pilot, the mission manager 18 ultimately acts as pilot-in-command, has access to a fail-safe management 16 system and can override any of the control inputs sent by operator-pilot 26.

Figure 3:
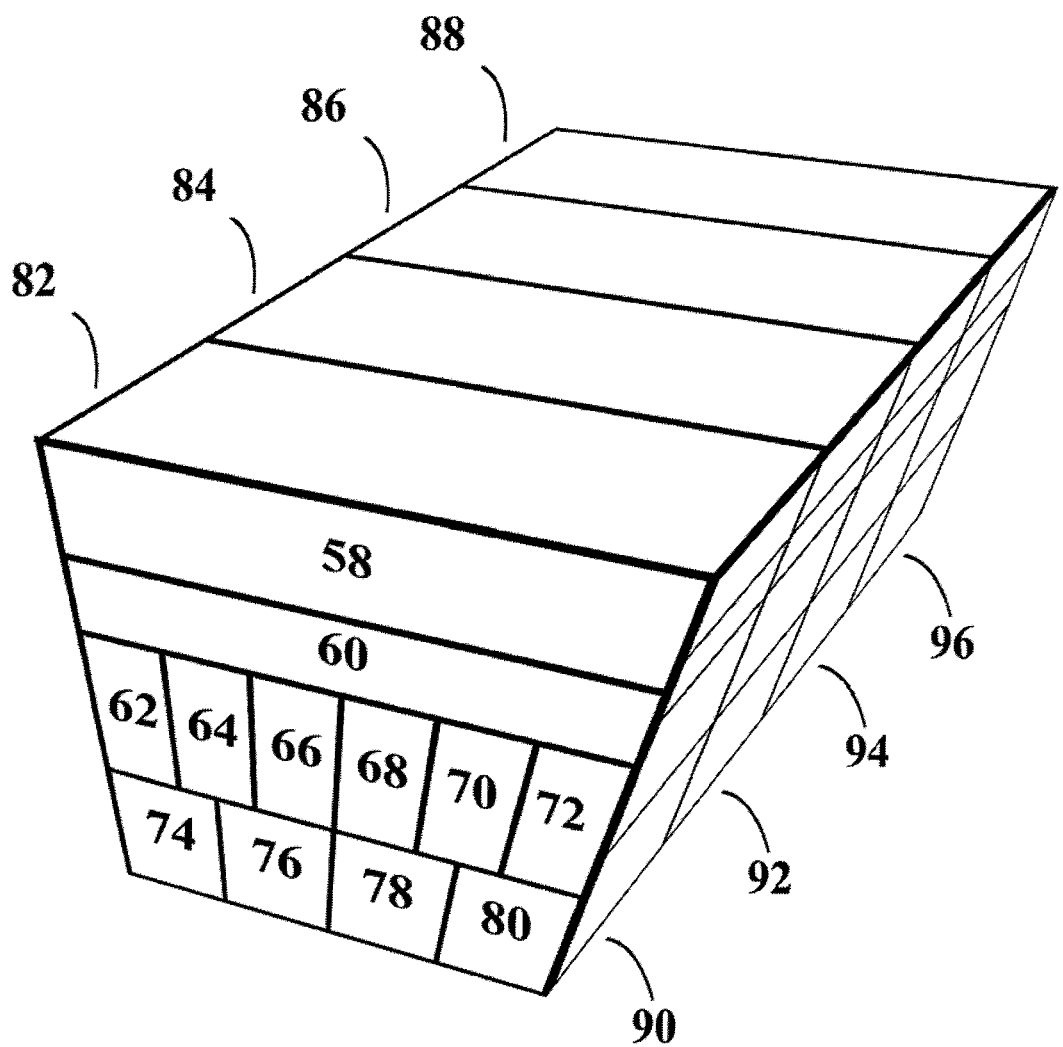
FIG. 3 is a perspective diagram illustrating the hierarchical structure of the present invention as it relates to mission tracking, image viewing, operator-pilots in-queue, active operator-pilots, sensors, and missions; as related to an aerial surveillance system.

Referring to FIG. 3, the diagram is a hierarchical representation of a management system for organizing the viewers 20, 22, 24 and operator-pilot 26 shown in FIG. 2, while relating them in a typical queuing system for tracking, viewing, standing-by, and operating-piloting up to four cameras and one aircraft, and while serving up to four distinct missions. The diagram is to help visualize priority positions for different levels of participation rather than to identify components. In this symbolic format, the complete diagram of FIG. 3 should be considered as a single host aircraft 10. The camera units 82, 84, 86, and 88 represent members of a camera pod 12 hosted by this aircraft 10. Mission assignments 90, 92, 94, and 96 represent the mission focus of their respective camera, which may be the same or up to four distinct and separate missions.

To understand how participants are prioritized, one should understand that an aircraft tracking viewer 58 may be one in ten-thousand persons (arbitrary) who have logged onto a website to track the locations and flight path of this particular flight (or other flights). It should also be understood that a camera viewer 60 may be one in a thousand persons (arbitrary) who have registered and downloaded a viewer software 50 and can view the image feed from any or all camera units 82, 84, 86, and 88 and observe the missions focus of each, which may be differing fields of view on the same subject or four completely different targets within the geographic footprint of the aircraft 10. Now that a viewer has watched the flight track and is one of the thousand persons viewing the image feed from the cameras on the flight he/she may choose to move into an operator queue position 62, 64, 66, 68, 70, or 72. To do this the individual viewer may be required to participate in an upgrade training 52 module in order to become qualified as a camera operator and/or pilot. After upgrading, a camera viewer 60 can move into the next available operator-pilot queue position 62, 64, 66, 68, 70, or 72. Six such positions are depicted in FIG. 3, but the quantity in the queue is arbitrary.

Now that the camera viewer 60 is qualified and in the queue, he may continue to view while standing-by until a camera operator or pilot relinquishes his/her operator-pilot 26 position. In this diagram there are four camera operator/pilot queue positions 74, 76, 78, and 80. Each of these positions represent a camera operators 26 that has control over respective ones of the four camera units 82, 84, 86, or 88. They are also in the queue to become the pilot for the aircraft. As only one pilot 26 may control the aircraft 10, this is a single task alternated between those in a camera operator 26 position, and is available only to those users in the queue who have been prequalified to pilot the aircraft. More specifically, each operator in position at 74, 76, 78, and 80 have qualified to operate a camera unit and have access to the control of one of the four camera units 82, 84, 86, and 88. Any one of these camera operators who has also qualified to act as pilot may be operating the aircraft 10 and his/her respective camera simultaneously or is operating one of the other cameras and is on standby for the pilot role when it becomes available. While operating a camera, the operator can focus on anything within the geographic footprint of the aircraft, but is subject to the course and location chosen by the single individual who is acting as the operator-pilot 26. The operator-pilot 26, which may be occupying any of the priority locations 74, 76, 78, or 80, has control over the course and location of the flight, as well as the directing of a camera unit 82, 84, 86, or 88.

This model is scalable with numerous configurations. The priority structure may be as complex as the one above, involving many viewers, users, and mission assignments; or it may operate as basic as a surveillance aircraft 10 hosting only one camera unit 82, and be fully controlled by one operator-pilot 26, in a position 74, while defining his/her own mission assignment 90.

Figure 4:
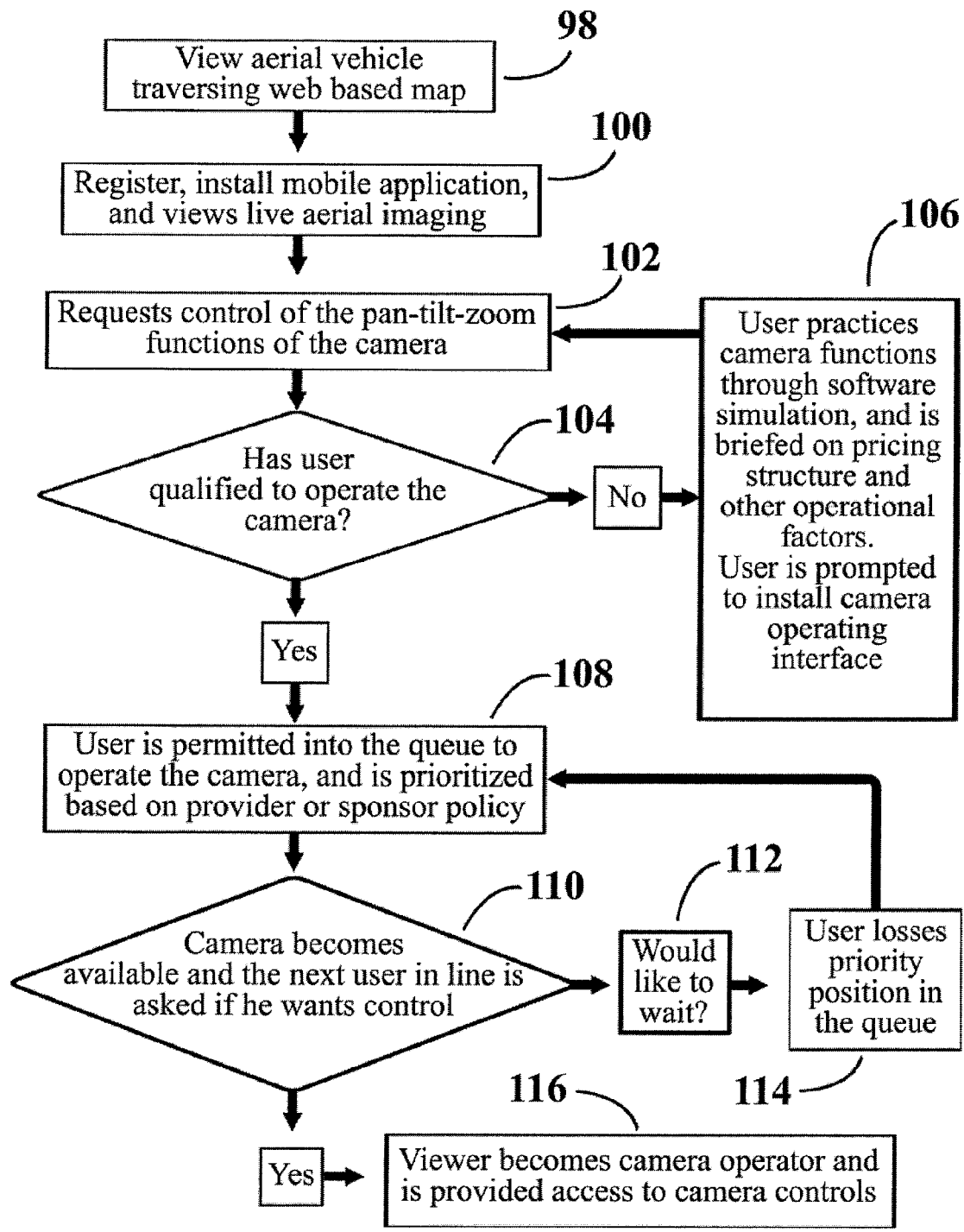
FIG. 4 is a flow chart of the preferred embodiment for user access to camera controls in a typical queuing configuration.

Referring to FIG. 4, the flow chart illustrates a process by which a participant in a tracking viewer 58 position (FIG. 3) can progress through steps to move to a camera operator/pilot queue positions 74, 76, 78, or 80. Tracking viewers 58 may be interested parties who primarily monitor a surveillance aircraft flight path across a web based map or tracking viewer function 98. This step 98 is the entry point into the system. Progressing on to step, image viewer function 100, typically requires the participant to register their information on a website, and in some configurations, download a mobile application to view live images broadcast by the surveillance aircraft. Step 100 correlates with camera viewer's 60 priority position in FIG. 3. Step, operator request function 102, involves a request to the service provider to gain access to controlling operable features of the camera system. A sub-step, operation qualification filter 104, diverts un-qualified users to a sub-step, operator certification function 106, to expose the user to an upgrade training 52 process (FIG. 2), prompts the user to download a camera control software 54 (FIG. 2), and may expose the user to certain administrative briefings.

After completing the requirements of sub-step, operator certification function 106, the user is passed back to step 102, and may proceed. The sub-step, operation qualification filter 104, allows a qualified user to progress to step, operator queue 108, where they have entered the operator queue 62, 64, 66, 68, 70, or 72 (FIG. 3). When a camera unit 82, 84, 86, or 88 (FIG. 3) comes available the user is prompted by sub-step, operator standby filter 110, to make a decision. It is anticipated that a user in the queue may want to wait for another time in the flight mission to operate the camera. If the user at sub-step, operator standby filter 110, chooses to wait in the queue, sub-step, operator standby decision 112, then a priority qualifier sub-step, operator priority re-direct 114, takes effect and the user is passed back to step, operator queue 108, with a discounted priority status. A "yes" decision by a user at sub-step, operator standby filter 110, allows the user to proceed to step, viewer upgraded to operator 116, where the user enters the camera operator/pilot queue position 74, 76, 78, or 80 (FIG. 3), is allowed access to a camera control system 30 (FIG. 2), and is now in the priority line to act as pilot, if qualified, and to be allowed access to the flight control system 32 (FIG. 2).

Figure 5:
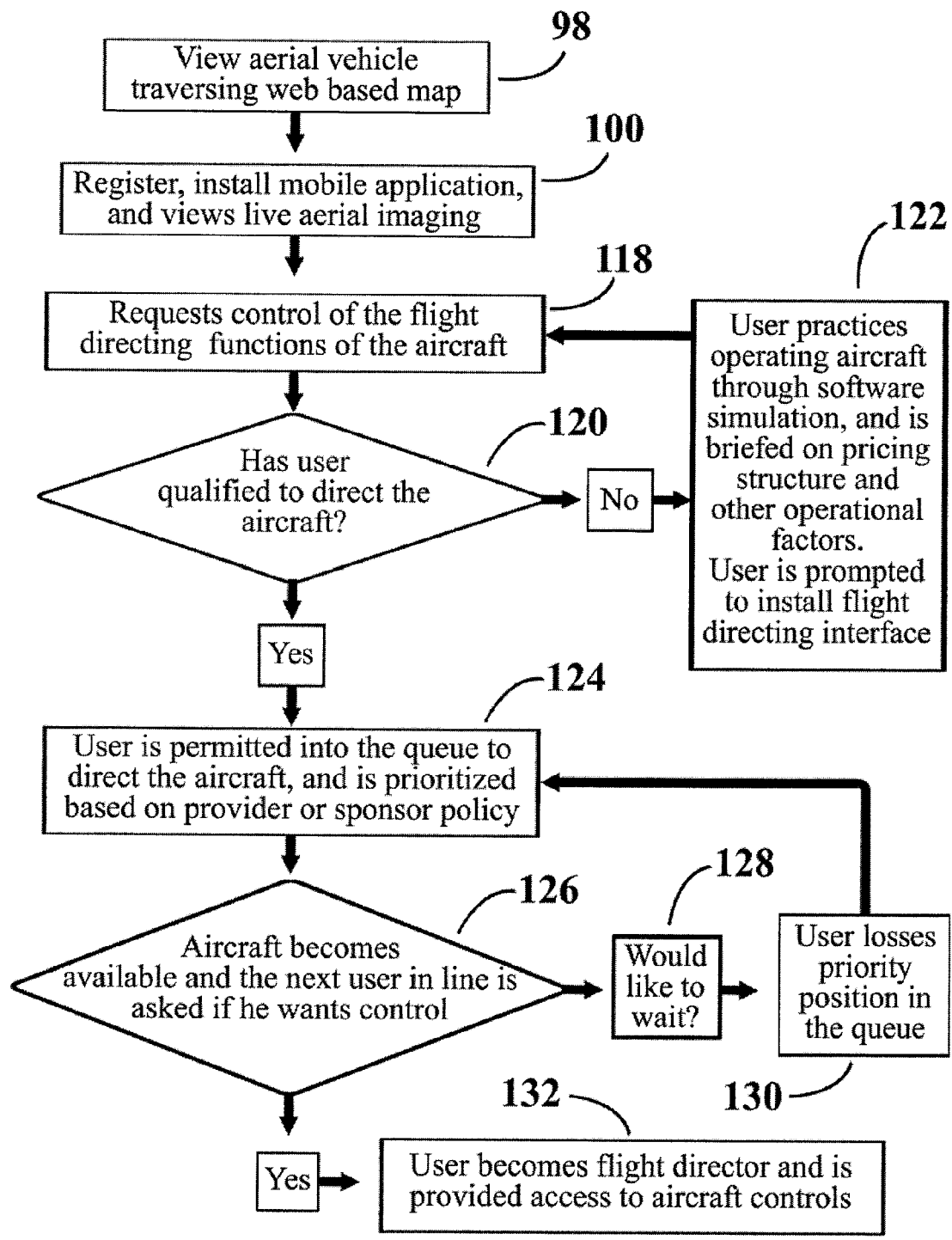
FIG. 5 is a flow chart of the preferred embodiment for user access to aircraft flight controls in a typical queuing configuration.

Referring to FIG. 5, the flow chart illustrates a process by which a participant in position: tracking viewer 58 (FIG. 3), can progress through steps to move to a camera operator/pilot queue positions 74, 76, 78, or 80, to qualify for access to flight control system 32 (FIG. 2), and to act as the pilot directing the surveillance aircraft. Tracking viewers 58 may be interested parties who primarily monitor a surveillance aircraft flight path across a web based map, tracking viewer function 98. Step 98 is the entry point into the system. Progressing on to step, image viewer function 100, typically requires the participant to register their information on a website, and in some configurations, download a mobile application to view live images broadcast by the surveillance aircraft. Step 100, correlates with a camera viewer's 60 priority position in FIG. 3. Step, pilot request function 118, involves a request to the service provider to gain access to operating the flight control system 32 (FIG. 2). A sub-step, pilot qualification filter 120, diverts un-qualified users to a sub-step, pilot certification function 122, to expose the user to an upgrade training process 52 (FIG. 2), prompts the user to download flight control software 56 (FIG. 2) and may expose the user to certain administrative briefings.

After completing the requirements of sub-step, pilot certification function 122, the user is passed back to step, pilot request function 118, and may proceed. The sub-step, pilot qualification filter 120, allows a qualified user to progress to step, pilot queue 124, where they have entered the operator queue 62, 64, 66, 68, 70, or 72 (FIG. 3). When a camera unit 82, 84, 86, or 88 (FIG. 3) comes available the user may choose to follow the path described in FIG. 4 and operate a camera. If the user prefers, he may remain in the operator queue until a dual position is available in camera operator/Pilot queue 74, 76, 78, or 80, as to operate both a camera and to act as pilot. When this preferred position becomes available the use is prompted by sub-step, pilot standby filter 126, to make a decision. It is anticipated that a user in the queue may want to wait for another time in the flight mission to act as pilot. If the user at sub-step, pilot standby filter 126, choses to wait in the queue, sub-step, operator standby decision 128, then a priority qualifier, sub-step, operator priority re-direct 130, takes effect and the user is passed back to step, pilot queue 124, with a discounted priority status. A "yes" decision by a user at sub-step, pilot standby filter 126, allows the user to proceed to step, viewer upgraded to pilot 132, where the user enters the camera operator/pilot queue position 74, 76, 78, or 80 (FIG. 3) and is allowed access to the flight control system 32 (FIG. 2) and, if qualified, may also access the next available camera control system 30. At any given point, if no operator/pilot 26 chooses to assume the role of step, viewer upgraded to pilot 132, the mission manager 18, becomes the pilot in control of flight control system 32 (FIG. 2) by default.

Referring to FIG. 6, the matrix table illustrates one form of management structure for aerial surveillance services. The table shows the relationship between participants and featured options, determined by participation and certification level. Along the left side of the table, in descending order, the most limited participant is a Visitor. By use of the processes illustrated by FIG. 4, or FIG. 5, or modification thereof, a Visitor may progress to more advanced levels: Client, Pro Client, Operator, Pilot, Pro Pilot/Operator, or Commercial Pilot/Operator. It is not inherently necessary to progress through each level in order to advance to Sponsor or Provider/Licensee. One may choose, after becoming a Client, to move directly to being a Sponsor, or may go through a different process to become a Provider/Licensee. The final category of Licensor references the company which owns the technology and all of its privileges. Across the top of the table there are categories of access and privileges afforded the participants as indicated. This matrix table is provided as an example and is anticipated to have variations, as might occur to one skilled in the art, and are thereby considered the intent of this preferred embodiment.

Referring to FIG. 7, the matrix table illustrates one form of a fee and compensation management structure for aerial surveillance services. The table shows the relationship between participants and marginal revenue, determined by participation and type of service feature. Some features can provide positive and/or negative revenue flow for the participant identified on the left, and are indicated by a plus (+) or minus (−) sign respectively. Along the left side of the table, in descending order, the most limited participant is a Visitor. By use of the processes illustrated by FIG. 4, or FIG. 5, or modification thereof, a Visitor may progress to more advanced levels: Client, Pro Client, Operator, Pilot, Pro Pilot/Operator, or Commercial Pilot/Operator; each having a different fee structure. It is not inherently necessary to progress through each level in order to advance to Sponsor or Provider/Licensee. One may choose, after becoming a Client, to move directly to being a Sponsor, or may go through a different process to become a Provider/Licensee. The final category of Licensor references the company which owns the technology and all of its privileges. Across the top of the table there are categories of service features afforded the participants as indicated. This matrix table is provided as an example and is anticipated to have variations, as might occur to one skilled in the art, and are thereby considered the intent of this preferred embodiment.

Figure 8:
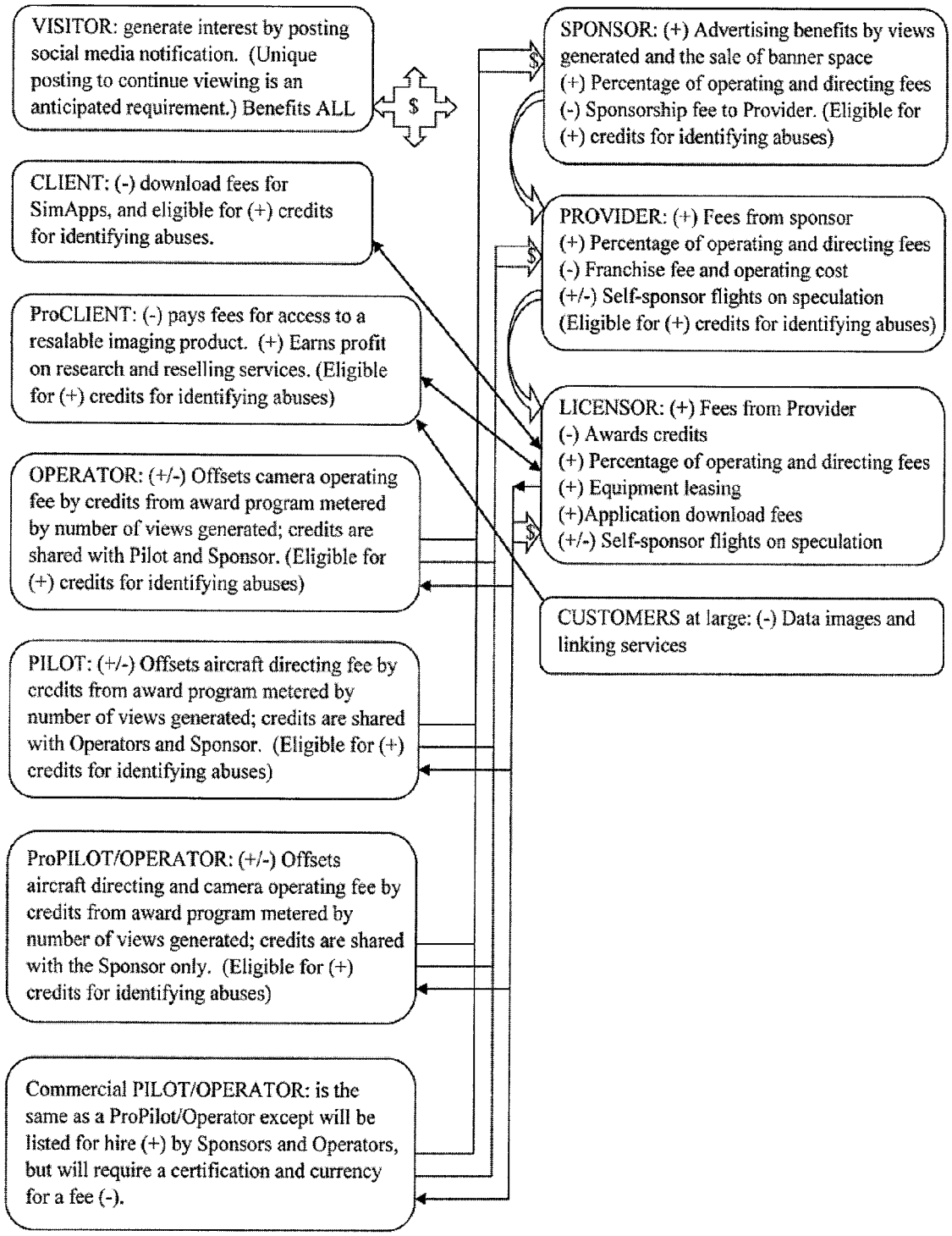
FIG. 8 is a flow chart of the preferred embodiment showing revenue flow relating to a fee and compensation model.

Referring to FIG. 8, the flow chart is a more detailed representation of a fee and compensation model for aerial surveillance services; and focuses on the flow of funds, rather that the management structure of FIG. 7. The illustration is provided with arrows to indicate direction of positive cash flow. Some are small-solid arrows indicating minor cash flow, while the major cash flow is indicated by a hollow arrow bordering a dollar symbol. It may be noted that this example shows the Sponsor, Provider and Licensor as receiving major positive cash flow. Another example shows all, except the unregistered Visitor, as having potential for receiving minor cash flow or credits, for participating in a program to identify abuse. This misuse reporting system is part of an integral safeguard system whereby all users have access to a mechanism for reporting misuse (i.e. sending a misuse report). These misuse reports alert the Mission Manager and Provider/Licensee, each having the ability to censor image output, to disrupt the imaging process, or terminate the image feed as needed. The Visitor is shown as providing benefit to all in the system by driving traffic to the website through visiting the site. An extension of this visitor program may include a requirement to increase traffic by the visitor posting social media, or other notifications, to friends and associates in order to maintain free access to flight tracking. This flow chart is provided as an example and is anticipated to have variations, as might occur to one skilled in the art, and are thereby considered the intent of this preferred embodiment.

Figure 9:
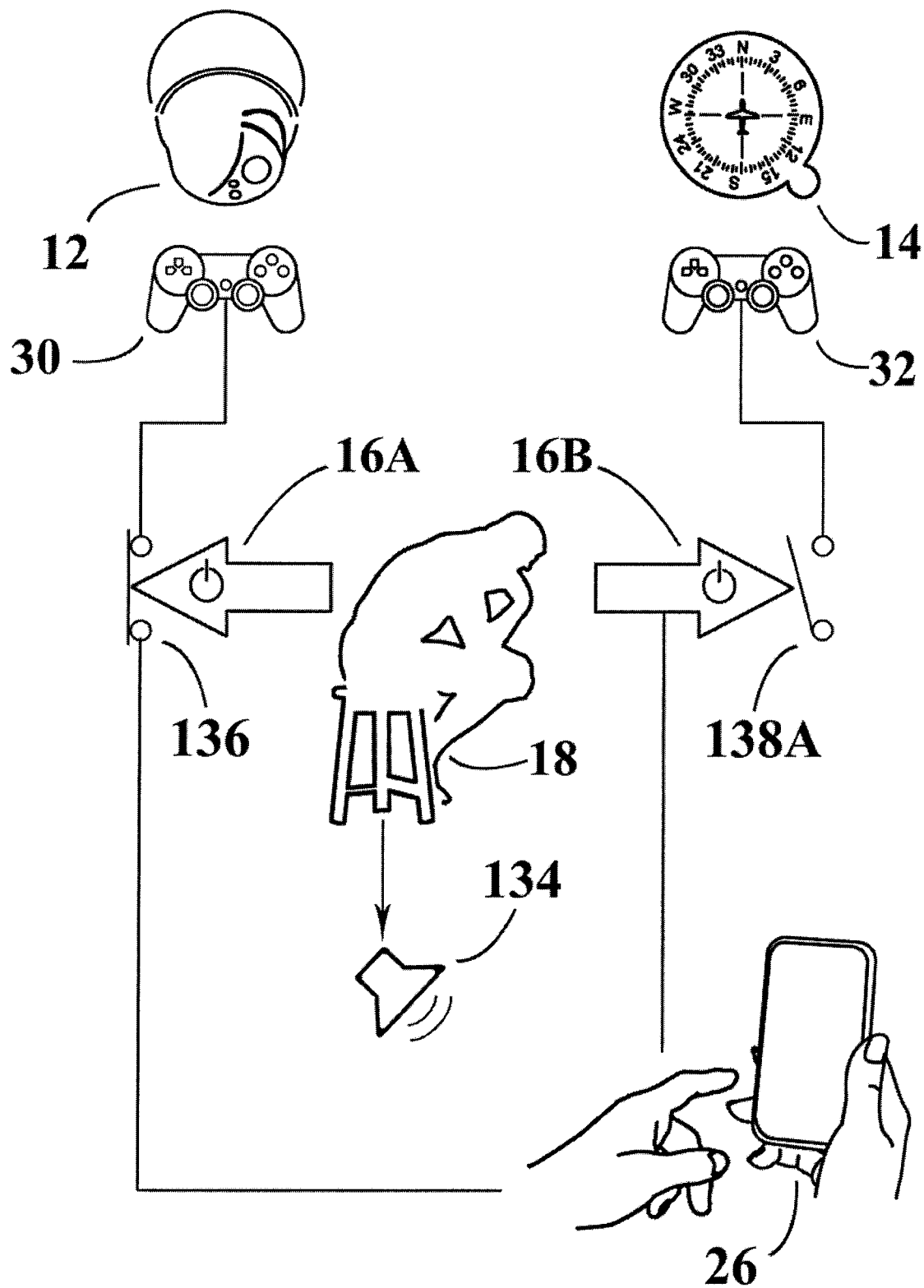
FIG. 9 is a schematic diagram illustrating a fail-safe system which provides an allow-or-disallow process for aircraft control; and a disrupt mechanism for suspending camera operations.

Referring to FIG. 9, the schematic diagram illustrates one configuration of a fail-safe system. For reference, FIG. 2 illustrated the components of an aerial surveillance system which combined a means for: uploading signal data, an active operator-pilot, and a failsafe system for overriding operator-pilot inputs. FIG. 9 provides further detail in this relationship between operator-pilot 26 and the two components of the aerial surveillance system which may be controlled remotely: the aircraft guidance system 14, by means of the flight control system 32, and the camera pod 12, by means of the camera control system 30. Shown is the mission manager 18 as the final decision making authority in this process. It is the purpose of the mission manager 18 to prevent or mitigate undesirable input from operator-pilot 26.

The interruption means for input to the flight control system 32 is shown as an allow-or-disallow process. Mission manager 18 controls an action method: fail-safe flight control override 16B. This override 16B has effect on a switching process: flight control system switch, allow/disallow 138A. As shown, the input from operator-pilot 26 connects through the control override 16B and is allowed to act on flight control system 32 only by action of mission manager 18 by means of the flight control system switch, allow/disallow 138A. When an input is received from the operator-pilot 26, it is up to the mission manager 18, and dependent upon the manager's action, to allow the input to produce an effect. In this illustration, the flight control system switch, allow/disallow 138A, is shown in the naturally open, or disallow condition, requiring an action by the mission manager 18, before an input becomes action.

The interruption means for input to the camera control system 30, is shown as a disrupt mechanism. Mission manager 18, controls an action method: fail-safe camera override 16A. This override 16A has effect on a switching process: camera control system switch 136. As shown, the input from operator-pilot 26 connects through the camera control system switch 136, which is shown in the naturally closed or allow condition, and requires no action by the mission manager 18 for the input from the operator-pilot 26 to become action. Camera control system switch 136 requires action by the mission manager 18, through control override 16A, in order to suspend or disrupt the input from operator-pilot 26. This same action can also suspend or disrupt the broadcast of related imagery from the camera pod 12 as part of the fail-safe.

For any actions by the mission manager 18, a mechanism is provided as a pilot-operator alert system 134, to notify the pilot/operator 26 of permissive or restrictive action taken by the mission manager 18.

As symbolized in FIG. 9, the mission manager 18 is shown as a human decision maker, situated remotely in a separate control station, or who is collocated with the aircraft 10 in the cockpit. The mission manager 18 may otherwise be an autonomous computational-logic-mechanism, interconnected anywhere in the system, and may not be dependent on human decision. This configuration is provided as an example and is anticipated to have variations, as might occur to one skilled in the art, and are thereby considered the intent of this preferred embodiment.

Figure 10:
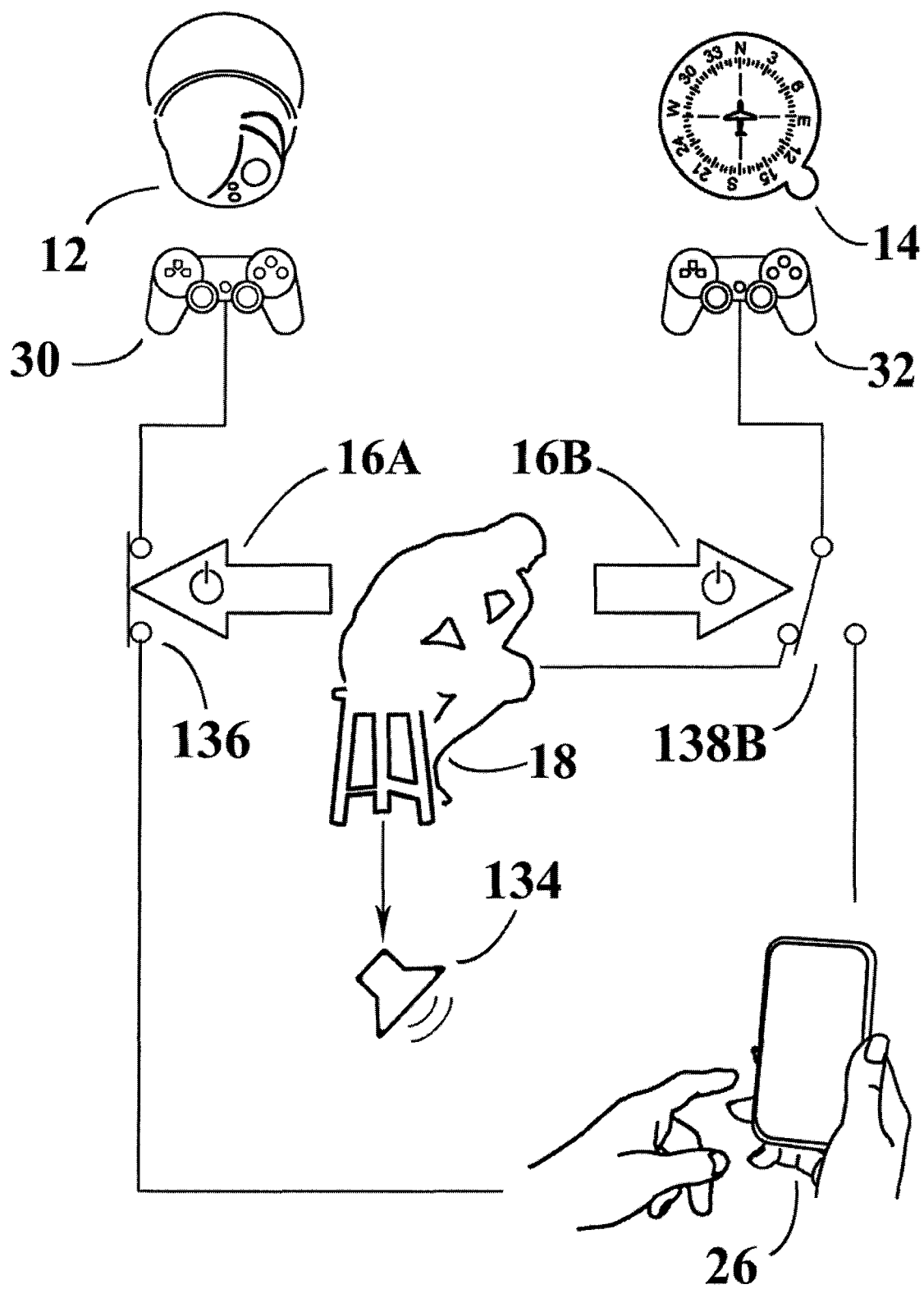
FIG. 10 is a schematic diagram illustrating a fail-safe system which provides a means of selecting between a pilot and pilot-manager for aircraft control; and a disrupt mechanism for suspending camera operations.

Referring to FIG. 10, the schematic diagram illustrates another configuration of a fail-safe system. For reference, FIG. 2 illustrated the components of an aerial surveillance system which combined a means for: uploading signal data, an active operator-pilot, and a failsafe system for overriding operator-pilot inputs. FIG. 10 provides further detail in this relationship between operator-pilot 26 and the two components of the aerial surveillance system which may be controlled remotely: the aircraft guidance system 14, by means of the flight control system 32, and the camera pod 12, by means of the camera control system 30. Shown, is the mission manager 18, as the final decision making authority in this process. It is the purpose of the mission manager 18 to prevent or mitigate undesirable input from operator-pilot 26. The interruption means for input to the flight control system 32 is shown as a selector. Mission manager 18 controls an action method: fail-safe flight control override 16B. This override 16B, has effect on a switching process: flight control system selector, pilot/manager 138B. As shown, the input from operator-pilot 26 is not connected by the flight control system selector, pilot/manager 138B, and is not allowed to act on flight control system 32. Also shown, the flight control system selector, pilot/manager 138B is connected to input from the mission manager 18 exclusively. In this condition only input from the mission manager 18 can act on the flight control system 32. Alternatively, the mission manager may act using fail-safe 16B to switch the flight control system selector, pilot/manager 138B, to a condition allowing direct throughput by operator-pilot 26 to flight control system 32. By this means, it is up to the mission manager 18, and dependent upon the manger's action to allow input from the operator-pilot 26 to produce an effect on the flight control system 32. More plainly, the flight control system selector, pilot/manager 138B, is shown allowing the mission manager 18 to act upon the flight control system 32. An alternate position of the flight control system selector, pilot/manager 138B, allows the operator-pilot 26 to act upon the flight control system 32.

The interruption means for input to the camera control system 30 is shown as a disrupt mechanism. Mission manager 18 controls an action method: fail-safe camera override 16A. This override 16A has effect on a switching process: camera control system switch 136. As shown, the input from operator-pilot 26 connects through the camera control system switch 136, shown in the naturally closed or allow condition, and requires no action by the mission manager 18 for the input from the operator-pilot 26 to become action. Camera control system switch 136 requires action by the mission manager 18, through control override 16A, in order to suspend or disrupt the input from operator-pilot 26. This same action can also suspend or disrupt the broadcast of related imagery from the camera pod 12 as part of the fail-safe.

For any actions by the mission manager 18, a mechanism is provided as an operator-pilot alert system 134 to notify the operator-pilot 26 of permissive or restrictive action taken by the mission manager 18.

As symbolized in FIG. 10, the mission manager 18 is shown as a human decision maker situated remotely in a separate control station, or who is collocated with the aircraft 10 in the cockpit. The mission manager 18 may otherwise be an autonomous computational-logic-mechanism, interconnected anywhere in the system, and may not be dependent on human decision.

This configuration is provided as an example and is anticipated to have variations, as might occur to one skilled in the art, and are thereby considered the intent of this preferred embodiment.

It is to be understood that the present system provides a number of advantages. As to control of sensor (camera, etc.), in our present society privacy and socially sensitive data (imagery, etc.) is subject to certain controls, even if they are legally obtained. One aspect of the present system is to allow for the Provider/Licensee or Licensor (i.e. Managers of the surveillance service—See FIG. 6 under the Failsafe System column) to filter out or block objectionable surveillance for whatever reason. Further, it is anticipated that all participants, whether a Visitor, Client, ProClient, Operator, Pilot, ProPilot/Operator, Commercial Pilot/Operator, Sponsor, Provider/Licensee, or Licensor (also See FIG. 6) will have access to some form of reporting, monitoring, and/or overriding of inappropriate data feeds (imagery, etc.), up to and including termination of the mission. These functions are facilitated through the related software application. It is also anticipated that the reporting of misuse by casual Visitors, active Clients, and/or other participants may be assigned a value so that when an aggregate response forms a consensus, a "value-based system setting" within the software would interrupt the data feed automatically.

As for control over the vehicle (host aircraft, etc.), within FAA controlled airspace and in the vicinity of other aircraft, it is necessary for the platform (sensor host aircraft) to be under the supervision and ultimate control of a qualified operator. A qualified operator today, is an FAA Certificated Pilot. With certain limitations, some airspace has been made accessible by a restricted category of aircraft, which may be operated by other than an FAA Certificated Pilots, which is referred to as a Certified Pilot-in-command (PIC), as recognized by an association or controlling company.

Now, although the pilot-in-command (PIC) may in some cases be monitoring the data feed and may have a means to interrupt the feed as a video failsafe mechanism (FIGS. 9, and 10, 16A and 136), the primary role of a pilot-in-command is to assure safe and legal operation of the vehicle, in other words to assure that it is operated within applicable regulations and accepted safety parameters (e.g. traffic, weather, obstacle and terrain avoidance). (See FIG. 9, 16B and 138A; also FIG. 10, 16B and 138B) In FIG. 9 the PIC 18 receives a command input from the operator and, as he sees fit (within safe and legal means) he passes that command on through the system (via 16B and 138A) allowing it to take effect. This provides positive "flow-through" control by the PIC. In FIG. 10 the PIC 18 has two options. With 138B selector in the position shown, the PIC is in full control of the aircraft. When positioned to the opposite terminal via a switching mechanism 16B (which may be a mechanical selector or a selection within a software interface) (and by the action of the PIC) the remote operator now becomes the direct controller of the aircraft. However, the PIC 18 still has safety override capabilities by reselecting and reacquiring the controls. This provides positive control by the remote operator with an "either/or" option for the PIC 18 to take positive control.

The usefulness of the present system can be illustrated by the following example. A national news agency sponsors a mission aircraft with four cameras, on station over a natural disaster, such as hurricane Katrina in New Orleans. The news agency allows other entities control of individual cameras. Now we have a news director (Sponsor on FIG. 6, also acting as pilot/operator 26) who may know nothing about flying an aircraft in restricted airspace, and he is dragging and dropping an aircraft symbol on an iPad to locations of interest around the city. As long as these inputs meet safety and legal restrictions, the pilot on board (PIC) (i.e. mission manager 18) can allow the inputs to flow through to the aircraft's guidance system while the PIC maintains override authority over the operation of the aircraft, thereby assuring that the aircraft is operated in a safe and legal manner. There are three other news agencies using the available cameras (i.e. acting as camera operators 26) when the sponsoring news agency pans across a scene in which they want to hold as a news exclusive, or that may be inappropriate for live feed. The news agency Sponsor (or Mission Manager) has the ability through their online or software interface to suspend the other agency cameras and limit the broadcast, as an override or failsafe measure for the cameras.

As can be seen, this system allows anybody to sponsor a flight in the vicinity of any target of interest, in most any airspace, and to allow most any designated person on the ground to direct or manage the mission, while allowing multiple camera operators from different locations to manipulate the cameras to suit their own interests. None of these entities need to be connected by necessity, except that they have a common interest in the subject area and are connected to the mission aircraft through the online or software interface. If it is an open mission, available to any qualified participant, then the queuing feature comes into play. Prospective clients can enter the queue and await their turn to operate a camera or to reposition the aircraft to suit their purpose. All the while, visitors to the system can be watching the live feed from one or all of the cameras. The online or software interface also manages a financial structure that can compensate camera operators, sponsors, etc.

To further illustrate the invention, typical camera control proceeds as follows. The user loads a Mobile App on a smart phone or other computing device. When connected via Wi Fi, this Mobile App interfaces with the managing host server to allow the user to enter the camera operator queue and later operate within the system via the internet. This host server is typically on the ground in a mobile or fixed control center. The host server and host program then connects via radio signal to the operated camera surveillance system onboard the aircraft for uploading command and control prompts as indicated by commands received by the host server from the user's Mobile App. Command and control prompts may also be uploaded to the aircraft via a radio signal enabled device to control the camera from a field location without a connection through the internet. This direct method is still monitored and/or managed by the mission manager aboard the aircraft and does not require an internet connection.

Downloaded imaging product follows a similar path in the other direction. The camera (or similar surveillance data collection device) streams information to a host server. The host server then can distribute the images/collected data as provided for by software determination, and according to variations described in FIG. 6, Participation and Certification Levels. Imaging may also be broadcast directly, via radio signal, to clients in the field who are equipped with proper signal receiving equipment. This later method would bypass the host server for viewing purposes.

In summary, the camera operators and viewers have access to a software enabled computing device that is interfacing with the aircraft's software enabled onboard computer to provide command prompts and to receive data.

Navigating or controlling the aircraft is similar but utilizes a different software set, separate and apart from the camera interface. This software set may or may not be hosted on the same computers as the camera system, but can operate on the same path through different channels or frequencies.

It is to be appreciated, that one of the aspects of the present invention is the provision of a novel system comprising a vehicle equipped with a sensor which can broadcast in substantially real time to a plurality of viewers, in which a plurality of persons are provided access through a queuing, organizing, or ranking system in which to participate as a sensor operator. This sensor operator does not require specific knowledge relating to operation of the vehicle and can simply be a passive viewer of an image feed from a vehicle carrying the sensor. Alternatively, the sensor operator can be the person in control of the operation of the vehicle (e.g. be simultaneously piloting the vehicle). The sensor may be a data gathering device for capturing recordable or measurable data, such as images, signals, contours, temperatures, material density.

The vehicle carrying the sensor may be a manned vehicle (land, sea, air), such as a manned aircraft. The manned aircraft may be a commercially certified aircraft through the civil aviation authorities. Alternatively, the vehicle may be an autonomous vehicle (land, sea, air), such as an autonomous aircraft, which may be a commercially certified autonomous aircraft through the civil aviation authorities.

The sensor may be operated from within the vehicle (collocated), from a remote location (e.g. fixed or mobile ground station), or from an electronic mobile computing device. The sensor feed may be viewed from an electronic device, a mobile computing device, a computer, or a ground monitoring station.

The sensor operator may control who has access to the sensor data by electing levels of data-feed privacy, for example, limiting access to the sensor information to discrete individuals of specified groups. For example sensor access may be given to the general public, to discrete customer groupings, to a specified viewer or viewers, or only to the sensor operator. The sensor operator may also elect levels of personal anonymity (operator's identity) and may allow or withhold identity regarding general public, discrete customer groupings, specified viewer(s), or may remain non-disclosed.

The sensor operator may also participate in a reward structure that allocates compensation for access to the sensor data. The reward structure may pay dividends in monetary form or in system credits. The sensor operator may be certified to a professional level so as to be sanctioned as an industry professional, or to be sanctioned to charge for commercial services.

Another aspect of the present invention is the provision of a novel system comprising a piloted vehicle equipped with a sensor which can broadcast in substantially real time to a plurality of viewers, in which a plurality of persons are provided access through a queuing, organizing, or ranking system in which to participate as a pilot. The pilot may be vetted through a familiarization program on operational parameters but does not require a technical, civil, or military certification to direct the vehicle. Instead, the vehicle may be backed up or overseen by a certificated pilot (mission manager) recognized by a controlling authority. Alternatively, the vehicle may be operating in an area not requiring a certificated pilot to be in operational control.

The vehicle may be a manned vehicle (land, sea, air), such as a manned a manned aircraft. The manned aircraft may be a commercially certified aircraft through the civil aviation authorities. Alternatively, the vehicle may be an autonomous vehicle (land, sea, air), such as an autonomous aircraft, which may be a commercially certified aircraft through the civil aviation authorities.

The pilot may control the vehicle from within the vehicle (collocated), from a remote location (e.g. fixed or mobile ground station), from an electronic mobile computing device, or by prompts from a pilot to another pilot who manipulates the controls, by communication inputs to a system that prompts an autopilot, but can be overridden by another pilot.

The pilot may elect levels of navigational data privacy, limiting geo-data information to: the general public, discrete customer group, specified viewer(s), or the operator/pilot only.

The pilot may also elect levels of personal anonymity (pilot's identity) and may allow or withhold identity to specified individuals/groups such as: the general public, discrete customer group, specified viewer(s) payload operators, or may remain non-disclosed.

The pilot may be a participant in a reward structure that pays dividends in monetary form or in system credits from third parties, such as remote viewers of an image feed from the vehicle.

The pilot may certify to a professional level to be sanctioned as an industry professional and/or be sanctioned to charge for commercial services. The pilot may function as the sensor operator described above or be a different individual.

Another aspect of the present invention is the provision of a method of providing a piloted vehicle with an operational interrupt mechanism operable by a Mission Manager, equipped with a controlled sensor which can broadcast in substantially real time to a plurality of viewers, in which a plurality of persons are provided access through a queuing, organizing, or ranking system in which to participate as a pilot, or sensor operator. The sensor operator, vehicle pilot and Mission Manager may be the same person or different people. The Mission Manager may be collocated with the vehicle or located in remote location (e.g. fixed or mobile ground station). The mission manager may perform his oversight functions from an electronic mobile computing device.

The mission manager operates as a failsafe operationally authority with control over the vehicle. The failsafe may function as an operational over-watch with interrupt authority. The failsafe may act as a "command pass-through authority," receiving prompts then effecting those inputs directly. The failsafe authority may include navigational approval in regard to weather, traffic, airspace, terrain, vehicle limitations, safety, security, scheduling, convenience, or other specified limitations. The failsafe authority may include data collecting interrupt ability, and can act in regard to privacy, policy, legality, or other specified limitations. The failsafe authority may include data sharing interrupt ability, and can act in regard to privacy, policy, legality, or other specified limitations.

In another aspect, the invention provides a piloted vehicle, with an operational Mission Manager mechanism, equipped with a sensor which can broadcast in substantially real time to a plurality of remote viewers, in which a multiple persons are provided access through a queuing, organizing, or ranking system in which to participate as a pilot, or sensor operator. The remote viewers can openly view a broadcast data feed from a sensor. Alternatively, the remote viewers can be exclusively permitted to view a data feed from a sensor. The remote viewers can contribute to the failsafe oversight of the vehicle by reporting misuse to the mission manager via a misuse reporting system.

In another aspect, the invention provides a surveillance vehicle management system including a surveillance vehicle (e.g. aircraft 10), a control management system (e.g. a cloud based host computer implementing camera control and flight control software, 54, 56), and a failsafe mission management system (e.g. fail safe mission management 16). The surveillance vehicle carries one or more surveillance devices (e.g. cameras in cameral pod 12) and has a vehicle control system (e.g. guidance system 14 and flight control system 32) for controlling the direction of the vehicle's movement and a surveillance control system (e.g. camera control system 30) for controlling the operation of the surveillance devices carried by the vehicle. The control management system (e.g. cloud based host computer) outputs control commands to the vehicle control system and to the surveillance control system based on inputs received from one or more users (e.g. operator/pilot 26) who are remote from the surveillance vehicle, the control management system being configured to allocate the ability to control the direction of the vehicle's movement and the operation of the surveillance devices to different ones of the remote users (e.g. to a camera operator and to a pilot) in substantially real time. The failsafe mission management system (see e.g. 16A, 16B in FIGS. 9 and 10) is interposed between the control management system and the surveillance vehicle, and is configured to allow a mission manager (e.g. 18) to exercise failsafe control over the vehicle by assuming control over one or more of the vehicle control system and the surveillance control system. The vehicle may be an aircraft, and the mission manager may be an onboard pilot of the aircraft. The failsafe mission management system may be configured to allow the mission manager to assume control over the vehicle control system and the surveillance control system. The system may further include a surveillance device queuing system (e.g. host computer implementing software shown in FIG. 4) configured to maintain a queue of the remote users who are waiting to be placed in operational control of the one or more surveillance devices (e.g. waiting to become camera operators). The queuing system may be configured such that a first user in the queue provides the inputs to the surveillance control system for control of a first one of the surveillance devices and a second user in the queue provides the inputs to the surveillance control system for control of a second one of the surveillance devices. The system may also comprise a pilot queuing system (e.g. host computer implementing software shown in FIG. 5) configured to maintain a queue of the remote users who are waiting to be placed in operational control over the direction of the vehicle's movement (i.e. those waiting to become pilots). The system may further comprise a viewing system configured to provide an output from the one or more surveillance devices to a plurality of authorized viewers who are remote from the vehicle (e.g. host computer distributing camera feeds to viewers 20, 22, 24).

In another aspect, what has been described includes a surveillance vehicle management system comprising a surveillance vehicle (e.g. 10), a control management system (e.g. cloud based host computer), and a failsafe mission management system (e.g. 16). The surveillance vehicle carries one or more surveillance devices (e.g. cameras in pod 12) the output of which is being provided to a plurality of viewers (e.g. 20, 22, 24) who are remote from the vehicle. The surveillance vehicle has a vehicle control system (e.g. 14, 32) for controlling the direction of the vehicle's movement and a surveillance control system (e.g. 30) for controlling the operation of the surveillance devices carried by the vehicle. The control management system outputs control commands to the vehicle control system and to the surveillance control system based on inputs received from one or more users who are remote from the surveillance vehicle, the control management system being configured to allocate the ability to control the direction of the vehicle's movement and the operation of the surveillance devices to different ones of the remote users in substantially real time. The failsafe mission management system (e.g. 16) is interposed between the control management system and the surveillance vehicle, and is configured to allow a mission manager (e.g. 18) to exercise failsafe control over the vehicle by assuming control over one or more of the vehicle control system and the surveillance control system. The vehicle may be an aircraft, and the mission manager may be an onboard pilot of the aircraft. The failsafe mission management system may be configured to allow the mission manager to assume control over both the vehicle control system and the surveillance control system. The system may include a surveillance device queuing system (e.g. host computer implement software shown in FIG. 4) configured to maintain a queue of the remote users who are waiting to be placed in operational control of the one or more surveillance devices. When the vehicle carries multiple surveillance devices (e.g. multiple cameras in pod), the surveillance device queuing system may be configured such that a first user in the queue provides the inputs to the surveillance control system for control of a first one of the surveillance devices and a second user in the queue provides the inputs to the surveillance control system for control of a second one of the surveillance devices. The system may further include a pilot queuing system configured to maintain a queue of the remote users who are waiting to be placed in operational control over the direction of the vehicle's movement.

In another aspect, what is provided is a novel method for providing remote users temporary access to a surveillance vehicle in substantially real time. The method includes providing a surveillance vehicle carrying one or more surveillance devices (e.g. aircraft 10 with camera pod 12), providing the output from the surveillance devices to a plurality of remote viewers (e.g. 20, 22, 24), and providing a mission manager (e.g. 18) with failsafe control over the vehicle (e.g. as shown in FIGS. 9 and 10). The method involves receiving a request from a first remote user (e.g. step 118) to control the surveillance vehicle during a first period of time, determining an authorization level for the first user making the request (e.g. step 120), receiving control commands from the first user according to the determined authorization level during the first time period (e.g. 132); and operating the vehicle in accordance with the control commands received from the first user during the first time period and while the mission manager has failsafe control over the vehicle (see e.g. FIGS. 9 and 10). While the aircraft is on the same mission (i.e. during the same flight), the method repeats for a different user. In particular, the method further involves receiving a request from a second remote user to control the surveillance vehicle during a second period of time (e.g. after the first time period but during the same flight); determining an authorization level for the second user making the request; receiving control commands from the second user according to the determined authorization level during the second time period; and operating the vehicle in accordance with the control commands received from the second user during the second time period and while the mission manager has failsafe control over the vehicle. The vehicle may be an aircraft, and the mission manager may be a pilot on board the aircraft. Alternatively, the vehicle may be an unmanned aircraft and the mission manager is a pilot in command of the unmanned aircraft. The method may further include receiving a request from a third remote user to control one of the surveillance devices during a third period of time (e.g. 102); determining an authorization level for the third user making the request (e.g. 104); receiving surveillance control commands from the third remote user according to the determined authorization level during the third time period (e.g. 116); operating one of the surveillance devices in accordance with the control commands received from the third user during the third time period. The method may further comprise allocating credits to a sponsor of the vehicle from the third user (see e.g. FIGS. 6-8).

What has also been described is a novel method for providing multiple remote users access to a surveillance vehicle in substantially real time comprising: providing a surveillance vehicle (e.g. 10) carrying a surveillance device (e.g. a camera in pod 12) and having a mission manager (e.g. 18) exercising failsafe control over the vehicle (FIGS. 9 and 10); receiving requests from a plurality of remote viewers (20, 22, 24) to receive the output of the surveillance device, determining an authorization level of each of the remote viewers (e.g. requiring viewer's to log in and register), and providing the output of the surveillance device to each of the remote viewers in accordance with their determined authorization level (e.g. prioritizing viewers based on subscription level); receiving requests from a plurality of remote operators to control the operation of the surveillance device (102), determining an authorization level and priority of each of the remote operators (104), and providing a first one of the remote operators control over the operation of the surveillance device in accordance with the determined authorization level and priority during a first period of time (116); receiving requests from a plurality of remote pilots to control the operation of the vehicle (118), determining an authorization level and priority of each of the remote pilots (120), and providing a first one of the remote pilots operational control over the vehicle in accordance with the determined authorization level and priority during a second period of time (132). The method may further comprise providing a second one of the remote operators control over the operation of the surveillance device in accordance with the determined authorization level and priority after the first period of time. A plurality of surveillance devices may be carried by the vehicle, with a first one of the surveillance devices being controlled by the first remote operator and a second one being controlled by a second remote operator. The method may further comprise providing a second one of the remote pilots operational control over the vehicle in accordance with the determined authorization level and priority after the second period of time.

FOR REFERENCE: LIST OF NUMBERED FEATURES

Aircraft 10
Camera pod 12
Aircraft guidance system 14
Fail-safe management 16
Fail-safe camera override 16A
Fail-safe flight control override 16B
Mission Manager 18
Viewer 20, 22, 24
Operator-Pilot 26
Internet 28
Camera control system 30
Flight control system 32
Signal 34
Signal 36
Signal 38
Signal 40
Signal 42
Signal 44
Signal 46
Signal repeater 48
Viewer software 50
Upgrade training 52
Camera control software 54
Flight control software 56
Tracking viewer 58
Camera viewers 60
Operator queue 62, 64, 66, 68, 70, 72
Camera operator/Pilot queue 74, 76, 78, 80
Camera unit 82, 84, 86, 88
Mission assignment 90, 92, 94, 96
Tracking viewer function 98
Image viewer function 100
Operator request function 102
Operator qualification filter 104
Operator certification function 106
Operator queue 108
Operator standby filter 110
Operator standby decision 112
Operator priority re-direct 114
Viewer upgraded to operator 116
Pilot request function 118
Pilot qualification filter 120
Pilot certification function 122
Pilot queue 124
Pilot standby filter 126
Operator standby decision 128
Operator priority re-direct 130
Viewer upgraded to pilot 132
Pilot-operator alert system 134
Camera control system switch 136
Flight control system switch, allow/disallow 138A
Flight control system selector, pilot/manager 138B

What is claimed is:

1. A surveillance vehicle management system, comprising:
   a surveillance vehicle, the surveillance vehicle carrying one or more surveillance devices and having a vehicle control system for controlling the direction of the vehicle's movement and a surveillance control system for controlling the operation of the surveillance devices carried by the vehicle;
   a control management system that outputs control commands to the vehicle control system and to the surveillance control system based on inputs received from one or more users who are remote from the surveillance vehicle, the control management system being configured to allocate the ability to control the direction of the vehicle's movement and the operation of the surveillance devices to different ones of the remote users in substantially real time; and
   a failsafe mission management system interposed between the control management system and the surveillance vehicle, the failsafe mission management system being configured to allow a mission manager to exercise failsafe control over the vehicle by assuming control over one or more of the vehicle control system and the surveillance control system.

2. The system of claim 1 in which the vehicle is an aircraft.

3. The system of claim 2 in which the mission manager is an onboard pilot of the aircraft.

4. The system of claim 1 in which the failsafe mission management system is configured to allow the mission manager to assume control over the vehicle control system and the surveillance control system.

5. The system of claim 1 further comprising a surveillance device queuing system configured to maintain a queue of the remote users who are waiting to be placed in operational control of the one or more surveillance devices.

6. The system of claim 5 in which a first user in the queue provides the inputs to the surveillance control system for control of a first one of the surveillance devices and a second user in the queue provides the inputs to the surveillance control system for control of a second one of the surveillance devices.

7. The system of claim 1 further comprising a pilot queuing system configured to maintain a queue of the remote users who are waiting to be placed in operational control over the direction of the vehicle's movement.

8. The system of claim 1 further comprising a viewing system configured to provide an output from the one or more surveillance devices to a plurality of authorized viewers who are remote from the vehicle.

9. A surveillance vehicle management system, comprising:
  a surveillance vehicle, the surveillance vehicle carrying one or more surveillance devices the output of which is being provided to a plurality of viewers who are remote from the vehicle;
  the surveillance vehicle having a vehicle control system for controlling the direction of the vehicle's movement and a surveillance control system for controlling the operation of the surveillance devices carried by the vehicle;
  a control management system that outputs control commands to the vehicle control system and to the surveillance control system based on inputs received from one or more users who are remote from the surveillance vehicle, the control management system being configured to allocate the ability to control the direction of the vehicle's movement and the operation of the surveillance devices to different ones of the remote users in substantially real time; and
  a failsafe mission management system interposed between the control management system and the surveillance vehicle, the failsafe mission management system being configured to allow a mission manager to exercise failsafe control over the vehicle by assuming control over one or more of the vehicle control system and the surveillance control system.

10. The system of claim 9 in which the vehicle is an aircraft.

11. The system of claim 8 in which the mission manager is an onboard pilot of the aircraft.

12. The system of claim 9 in which the failsafe mission management system is configured to allow the mission manager to assume control over the vehicle control system and the surveillance control system.

13. The system of claim 9 further comprising a surveillance device queuing system configured to maintain a queue of the remote users who are waiting to be placed in operational control of the one or more surveillance devices.

14. The system of claim 13 in which a first user in the queue provides the inputs to the surveillance control system for control of a first one of the surveillance devices and a second user in the queue provides the inputs to the surveillance control system for control of a second one of the surveillance devices.

15. The system of claim 9 further comprising a pilot queuing system configured to maintain a queue of the remote users who are waiting to be placed in operational control over the direction of the vehicle's movement.

16. A method for providing remote users temporary access to a surveillance vehicle in substantially real time comprising:
  providing a surveillance vehicle carrying one or more surveillance devices;
  providing the output from the surveillance devices to a plurality of remote viewers;
  providing a control management system;
  providing a mission manager with failsafe control over the surveillance vehicle interposed between the control management system and the surveillance vehicle;
  receiving a request at the control management system from a first remote user to control the surveillance vehicle during a first period of time;
  determining an authorization level for the first user making the request;
  receiving control commands at the control management system from the first user according to the determined authorization level during the first time period;
  operating the vehicle in accordance with the control commands received at the control management system from the first user during the first time period and while the mission manager has failsafe control over the vehicle;
  receiving a request at the control management system from a second remote user to control the surveillance vehicle during a second period of time;
  determining an authorization level for the second user making the request;
  receiving control commands at the control management system from the second user according to the determined authorization level during the second time period; and
  operating the vehicle in accordance with the control commands received at the control management system from the second user during the second time period and while the mission manager has failsafe control over the vehicle.

17. The method of claim 16 in which the vehicle is an aircraft.

18. The method of claim 17 in which the mission manager is a pilot on board the aircraft.

19. The method of claim 16 in which the vehicle is an unmanned aircraft and the mission manager is a pilot in command of the unmanned aircraft.

20. The method of claim 16 further comprising:
  receiving a request at the control management system from a third remote user to control one of the surveillance devices during a third period of time;
  determining an authorization level for the third user making the request;
  receiving surveillance control commands at the control management system from the third remote user according to the determined authorization level during the third time period;
  operating one of the surveillance devices in accordance with the control commands received at the control management system from the third user during the third time period and while the mission manager has failsafe control over the vehicle.

21. The method of claim 20 further comprising allocating credits to a sponsor of the vehicle from the third user.

22. A method for providing multiple remote users access to a surveillance vehicle in substantially real time comprising:
  providing a surveillance vehicle carrying a surveillance device and a control management system and having a mission manager exercising failsafe control over the surveillance vehicle interposed between the control management system and the surveillance vehicle;
  receiving requests at the control management system from a plurality of remote viewers to receive the output of the surveillance device, determining an authorization level of each of the remote viewers, and providing the output of the surveillance device to each of the remote viewers in accordance with their determined authorization level;

receiving requests at the control management system from a plurality of remote operators to control the operation the surveillance device, determining an authorization level and priority of each of the remote operators, and providing a first one of the remote operators control over the operation of the surveillance device in accordance with the determined authorization level and priority during a first period of time;

receiving requests at the control management system from a plurality of remote pilots to control the operation of the vehicle, determining an authorization level and priority of each of the remote pilots, and providing a first one of the remote pilots operational control over the vehicle in accordance with the determined authorization level and priority during a second period of time.

23. The method of claim 22 further comprising:
providing a second one of the remote operators control over the operation of the surveillance device in accordance with the determined authorization level and priority after the first period of time.

24. The method of claim 22 in which there are a plurality of surveillance devices carried by the vehicle, a first one being controlled by the first remote operator and a second one being controlled by a second remote operator.

25. The method of claim 22 further comprising:
providing a second one of the remote pilots operational control over the vehicle in accordance with the determined authorization level and priority after the second period of time.

* * * * *

UNITED STATES PATENT AND TRADEMARK OFFICE
CERTIFICATE OF CORRECTION

| | | |
|---|---|---|
| PATENT NO. | : 9,688,399 B1 | Page 1 of 1 |
| APPLICATION NO. | : 14/490767 | |
| DATED | : June 27, 2017 | |
| INVENTOR(S) | : David R. Dobbins | |

It is certified that error appears in the above-identified patent and that said Letters Patent is hereby corrected as shown below:

In the Abstract, Line 13, the word "in" should be "is".

In Column 21, Line 40, cancel text beginning with "11. The system of claim 8…" and ending "…of the aircraft." in Column 21, Line 41; and insert the following claim:
--11. The system of claim 9 in which the mission manager is an onboard pilot of the aircraft.--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*